(12) United States Patent
Tareen et al.

(10) Patent No.: US 9,201,880 B2
(45) Date of Patent: *Dec. 1, 2015

(54) PROCESSING A CONTENT ITEM WITH REGARD TO AN EVENT AND A LOCATION

(71) Applicant: PulsePoint, Inc., New York, NY (US)

(72) Inventors: Amra Q. Tareen, San Francisco, CA (US); Sanjay C. Sood, Claremont, CA (US); Lawrence A. Birnbaum, Evanston, IL (US); Kristian J. Hammond, Chicago, IL (US); Erik Sundelof, Palo Alto, CA (US)

(73) Assignee: ALLVOICES, INC., San Bruno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,711

(22) Filed: Dec. 10, 2012

(65) Prior Publication Data

US 2013/0246440 A1        Sep. 19, 2013

Related U.S. Application Data

(63) Continuation of application No. 12/215,716, filed on Jun. 27, 2008, now Pat. No. 8,352,455.

(60) Provisional application No. 60/937,708, filed on Jun. 29, 2007.

(51) Int. Cl.
*G06F 17/30*        (2006.01)
*G06Q 10/00*        (2012.01)

(52) U.S. Cl.
CPC ...... *G06F 17/30017* (2013.01); *G06F 17/3087* (2013.01); *G06F 17/30722* (2013.01); *G06Q 10/00* (2013.01)

(58) Field of Classification Search
USPC .............................. 707/999.005, 999.102, 711
See application file for complete search history.

(56) References Cited

U.S. PATENT DOCUMENTS

| 7,006,820 | B1 | 2/2006 | Parker et al. |
|---|---|---|---|
| 7,068,189 | B2 | 6/2006 | Brescia |
| 7,383,308 | B1 | 6/2008 | Groves et al. |
| 8,275,839 | B2 | 9/2012 | Auerbach et al. |
| 8,312,049 | B2 | 11/2012 | Chayes et al. |

(Continued)

OTHER PUBLICATIONS

Watters, Carolyn and Wang, Hong, "Rating News Documents for Similarity," May 18, 2000, Journal of the American Society for Information Science, vol. 51, Issue 9, pp. 793-804. Office Action for U.S. Appl. No. 12/215,701, mailed Oct. 8, 2010, 19 pgs.

(Continued)

*Primary Examiner* — Bai D. Vu
(74) *Attorney, Agent, or Firm* — Sprinkle IP Law Group

(57) ABSTRACT

Associating a content item with an event is disclosed. A location associated with a received content item is determined. The received content item is associated with an event, at least in part based on an indicia of relatedness, other than the determined location, between the received content item and the event. A criterion that the indicia of relatedness is required to satisfy for the content item to be determined to be associated with the event has a lower value if the determined location associated with the received content item has a first degree of correspondence to a location associated with the event than if the determined location associated with the received content item has a second, lower degree of correspondence to the location associated with the event.

21 Claims, 10 Drawing Sheets

(56) References Cited

U.S. PATENT DOCUMENTS

| | | |
|---|---|---|
| 8,352,455 B2 | 1/2013 | Tareen et al. |
| 2002/0062368 A1 | 5/2002 | Holtzman et al. |
| 2002/0157101 A1 | 10/2002 | Schrader et al. |
| 2003/0069893 A1 | 4/2003 | Kanai et al. |
| 2003/0113109 A1 | 6/2003 | Pelletier |
| 2004/0183918 A1 | 9/2004 | Squilla et al. |
| 2004/0196307 A1 | 10/2004 | Zak et al. |
| 2004/0205698 A1 | 10/2004 | Schliesmann et al. |
| 2005/0064852 A1 | 3/2005 | Baldursson |
| 2005/0131935 A1 | 6/2005 | O'Leary et al. |
| 2005/0207622 A1* | 9/2005 | Haupt et al. ......... 382/118 |
| 2006/0048059 A1 | 3/2006 | Etkin |
| 2006/0083305 A1 | 4/2006 | Dougherty et al. |
| 2006/0184617 A1 | 8/2006 | Nicholas et al. |
| 2006/0253491 A1 | 11/2006 | Gokturk et al. |
| 2007/0008321 A1 | 1/2007 | Gallagher et al. |
| 2007/0038653 A1 | 2/2007 | Li et al. |
| 2007/0083894 A1 | 4/2007 | Gonsalves et al. |
| 2007/0115373 A1* | 5/2007 | Gallagher et al. ......... 348/231.3 |
| 2007/0156883 A1 | 7/2007 | Thompson et al. |
| 2007/0233708 A1 | 10/2007 | Baio et al. |
| 2007/0236729 A1* | 10/2007 | Yoda ............................ 358/1.15 |
| 2007/0260989 A1 | 11/2007 | Vakil et al. |
| 2008/0052026 A1* | 2/2008 | Amidon et al. ............... 702/104 |
| 2008/0091728 A1 | 4/2008 | Diederiks et al. |
| 2008/0141132 A1 | 6/2008 | Tsai |
| 2008/0172615 A1 | 7/2008 | Igelman et al. |
| 2008/0201361 A1 | 8/2008 | Castro et al. |
| 2008/0243906 A1 | 10/2008 | Peters |
| 2009/0019013 A1 | 1/2009 | Tareen et al. |
| 2010/0058220 A1 | 3/2010 | Carpenter |

OTHER PUBLICATIONS

Office Action for U.S. Appl. No. 12/215,701, mailed Dec. 4, 2013, 27 pgs.
Office Action for U.S. Appl. No. 12/215,701, mailed Oct. 8, 2010, 19 pgs.
Office Action for U.S. Appl. No. 12/215,716, mailed Oct. 8, 2010, 25 pgs.
Office Action for U.S. Appl. No. 12/215,701, mailed Feb. 17, 2011, 29 pgs.
Office Action for U.S. Appl. No. 12/215,716, mailed Mar. 14, 2011, 23 pgs.
Office Action for U.S. Appl. No. 12/215,701, mailed May 26, 2011, 31 pgs.
Office Action for U.S. Appl. No. 12/215,701, mailed Mar. 7, 2012, 32 pgs.
Office Action for U.S. Appl. No. 12/215,716, mailed May 24, 2012, 21 pgs.
Notice of Allowance for U.S. Appl. No. 12/215,716, mailed Oct. 1, 2012, 11 pgs.
Office Action for U.S. Appl. No. 12/215,701, mailed May 23, 2013, 26 pgs.
Office Action for U.S. Appl. No. 12/215,701, mailed Jun. 23, 2014, 17 pgs.
Office Action for U.S. Appl. No. 12/215,701, mailed Jan. 13, 2015, 20 pgs.

* cited by examiner

PROCESSING A CONTENT ITEM WITH REGARD TO AN EVENT AND A LOCATION

CROSS REFERENCE TO OTHER APPLICATIONS

This application is a continuation of co-pending U.S. patent application Ser. No. 12/215,716, entitled PROCESSING A CONTENT ITEM WITH REGARD TO AN EVENT AND A LOCATION filed Jun. 27, 2008 which is incorporated herein by reference for all purposes, which claims priority to U.S. Provisional Application No. 60/937,708, entitled MASALA SYSTEM FOR EVENT DETECTION, MATCHING AND TRACKING filed Jun. 29, 2007 which is incorporated herein by reference for all purposes.

BACKGROUND OF THE INVENTION

News sources typically provide consumers with stories that have been written by reporters and filtered, prioritized, and organized by editors to ensure appropriate selection and content quality. However, one problem with this approach is that reporters and editors bring their own biases to the process. An additional problem is that reporters and editors may not be familiar with the culture or background of the locale in which a news story takes place, and so may not be able to convey the full picture or meaning of what has happened. Finally, reporting and editing by professionals is expensive and has historically depended upon a favorable ratio of producers to consumers to be cost-effective (hence the term "mass media"). This approach doesn't scale to a larger and more diverse world of interests and information.

BRIEF DESCRIPTION OF THE DRAWINGS

Various embodiments of the invention are disclosed in the following detailed description and the accompanying drawings.

DETAILED DESCRIPTION

Figure 1:
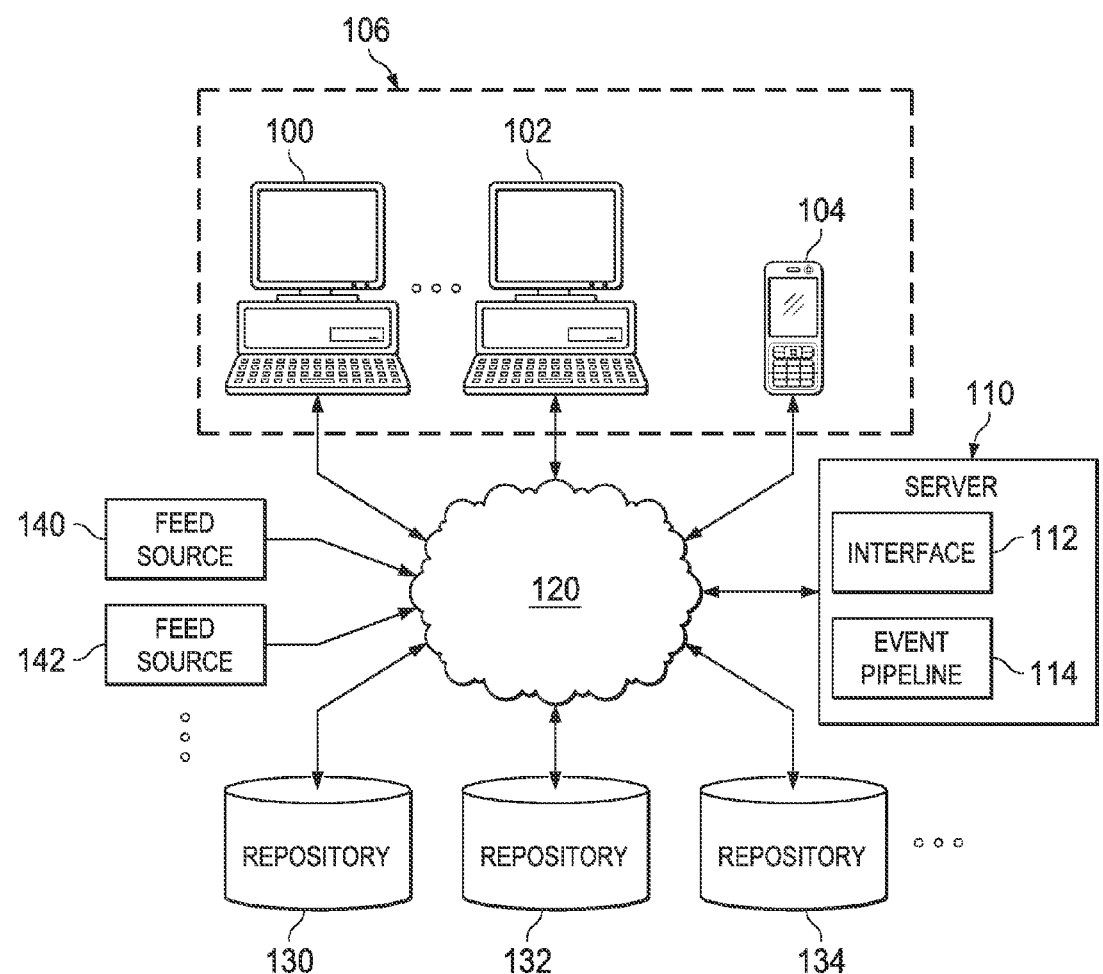
FIG. 1 is a block diagram illustrating an embodiment of a system for processing associated with events.

The invention described herein can be implemented in numerous ways, including as a process; an apparatus; a system; a composition of matter; a computer program; a product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Processing a content item with regard to an event is disclosed. A content item comprises a report, a comment, an image, and/or a video and pertains to one or more events. A user generates a content item. The user generated content item is processed to determine whether the user generated content item comprises an event. The user generated content item is processed to determine a location associated with the user generated content item. Alternatively, a content item is generated by one or more on-line feed sources. The feed sourced content item is processed to determine whether the feed sourced content item comprises an event or pertains to an existing event. The feed sourced content item is processed to determine a location associated with the feed sourced content item.

Additional content items are identified to provide supplemental information for a given event by actively querying an event repository (e.g., a system repository and/or a local repository) and/or content repositories (e.g., internet news sources, blogs, image web sites, video web sites, etc.). In some embodiments, an event is created based on a user-provided content item and a content item is aggregated with an event, where the content item is identified using a query to one or more repositories.

In various embodiments, an event comprises something that happens at a given place and time, something interesting, exciting, or unusual that a user or news source (e.g., as decided by an editor) want to share with others and discuss. Examples of events are: the price of real estate in San Francisco is going down; two people shot in a mall in Peshawar, Pakistan; honey and cinnamon—nature's best medicine; a sporting event at Stanford University, Palo Alto, Calif.; and/or the Olympics in China. In some embodiments, events are created or posted by users or contributors—for example, a person or user can post an event on a website associated with a server from a cell phone with SMS or via a website (e.g., by clicking on "post an event"). In some embodiments, an event is posted with an event title, a summary, a location and a category. In some embodiments, a person or user posts an event by uploading an image or video or by writing a blog or article on the website associated with a server. In some embodiments, events are automatically posted by the website associated with server—for example, the server uses news reported by newspapers and wire services as a starting point.

In some embodiments, a location associated with a received content item is determined. The received content item is associated with an event at least in part based on indicia of relatedness, other than the determined location, between the content item and the event. A criterion that the indicia of relatedness is required to satisfy for the content item to be determined to be associated with the event has a lower value if the determined location associated with the received content item has a first degree of correspondence to a location associated with the event than if the determined location associated with the received content item has a second, lower degree of correspondence to the location associated with the event. In some embodiments, location is used in combination with other indicia to determine whether a given content item should be associated with an event (e.g., using a weighted sum or other linear or non-linear joint function involving location overlap as well as similarity or other indicia). For example, features regarding a content item are assessed (e.g., via overlap or similarity, etc.) with respect to features regarding content items associated with an event. In various embodiments, this is an average or weighted sum involving feature overlap and/or feature similarity between a content item and content items associated with an event, a non-linear combination of feature overlap and/or feature similarity, or any other appropriate joint function. In some embodiments, indicia of relatedness comprise a time overlap between a time associated with the received content item and a time associated with the event. For example, a time overlap comprises being within a 24 hour window.

In some embodiments, a content item is associated with an event by determining a location associated with the content item and determining an event that is associated with the content item, wherein determining requires a first degree of similarity of an attribute other than location if the location associated with the content item is close to a location associated with the event and wherein determining requires a second degree of similarity of an attribute other than location if the location associated with the content item is not close to the location associate with the event. For example, if the location associated with a news article is close to the location associated with an event, then the news article topic does not require a particularly high degree of similarity to the event topic to be associated with the event; on the other hand, if the location associated with the new article is far from the location associated with the event, then the news article topic is required to have a high degree of similarity to the event topic to be associated with the event. In some embodiments, the features of an event (e.g., location, category, etc.) are determined by the content components that make up the event; a comparison is then between a piece of content and a collection of other pieces of content that make up an event.

In some embodiments, a received content item is processed by determining a location associated with the received content item, determining an event that is associated with the received content item, and revising, if appropriate, a location associated with the event based at least in part on the location associated with the content item. For example, a new content item is received from a user or other source and found to be associated with an existing event in the system; the location of the new content item is used to update, if appropriate, the location for the event (e.g., a more specific location such as a state instead of a country, a city instead of a state, etc., or the location of the event taking into account all locations [including the new content item location] of content items associated with the event is different). In some embodiments, the event is displayed associated with the location associated with the event.

FIG. 1 is a block diagram illustrating an embodiment of a system for processing associated with events. In the example shown, server 110 includes interface 112 and event pipeline 114. Interface 112 receives inputs and sends outputs via network 120. In various embodiments, network 120 comprises a wired network, a wireless network, the Internet, the world wide web, a local area network, a wide area network, or any other appropriate network. User 106—represented in FIG. 1 as a user using a personal computer (e.g., computer 100 or computer 102) or a user using a personal data assistant or smart phone (e.g., phone 104)—generates a content item (e.g., a reporting of an event) and provides the content item to server 110 via network 120. Feed sources—represented in FIG. 1 by feed source 140 and feed source 142—generate content items and provide the content items to server 110 via network 120. For example, feed sources comprise really simple syndication (RSS) feeds from selected web sites (e.g., news source sites, blogs, etc.) or query responses from news or other repositories. Content items provided to server 110 are processed by event pipeline 114 to determine whether a given content item comprises a new event or is or should be associated with and/or related to an existing event. Server 110 can identify and aggregate content by querying repositories (e.g., repository 130, repository 132, repository 134, etc.) and/or feed sources (e.g., feed source 140 and feed source 142, etc.) to supplement information associated with events.

In some embodiments, the website associated with server 110 is configured to create a global community that shares news, videos, images and opinions tied to events and people. For example, the website is a place where a person or user can tell the world what is happening where they are (e.g., a location) at a particular point in time; the website then brings together multiple points of view: news stories, video, images and blogs from the Internet, to provide context and build momentum. The website also provides the community the ability to search and navigate an event by location and category, and to share and to have a discussion around the event. In various embodiments, a contribution (e.g., a content item) is automatically checked for spam and relevance to the event, a contribution is not edited and is posted as is as long as it is relevant to the event, or any other appropriate processing. In some embodiments, the relevance is checked by algorithms. In some embodiments, relevance is based at least in part on computing a similarity score based on temporal, location, and/or textual similarity between the content item and a context model of the event.

Figure 2A:
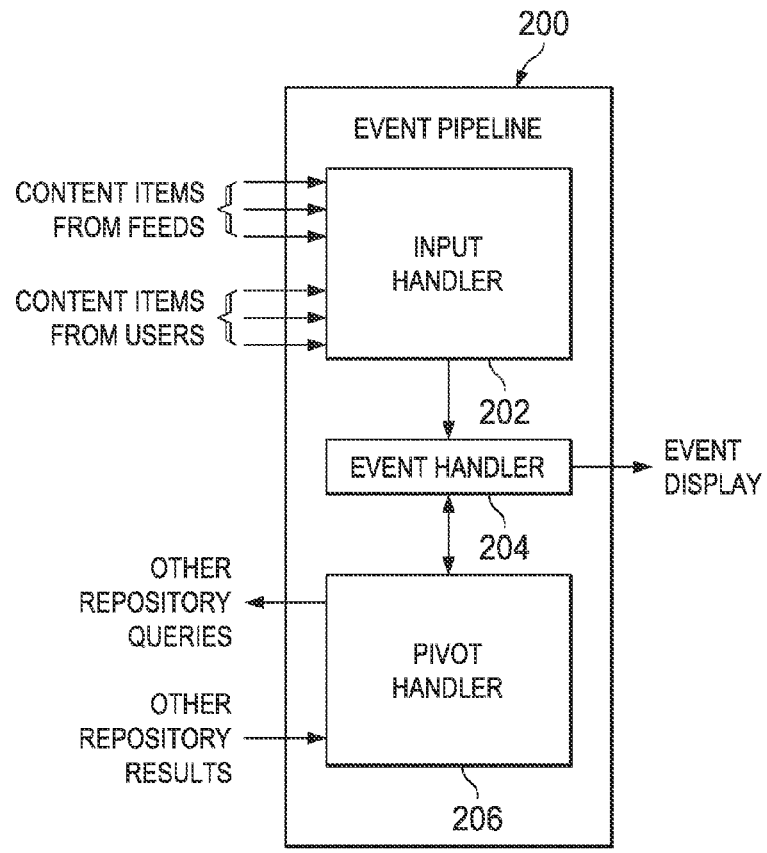
FIG. 2A is a block diagram illustrating an embodiment of an event pipeline.

FIG. 2A is a block diagram illustrating an embodiment of an event pipeline. In some embodiments, event pipeline 200 of FIG. 2 is used to implement event pipeline 114 of FIG. 1. In the example shown, event pipeline 200 includes input handler 202, event handler 204, and pivot handler 206. Input handler 202 receives content items from feeds and from users. In various embodiments, input handler 202 processes content items by generating a summary, detecting whether the content item is a duplicate or near duplicate of a previously received content item, determining a geographic location associated with the content item, identifying entities (e.g., a special named item, person, place, thing, etc.), and/or determining a category (e.g., politics, entertainment, sports, science and technology, conflict and tragedy, or business, etc.). Event handler 204 receives events from input handler 202. Event handler 204 indexes the received event and/or checks to see if the event is a new event or there is a related event. Event handler 204 also indicates if related content is to be found by using queries to sources and repositories. Event handler 204 includes an event repository that has an index of feed sourced events and user generated events which have been received by the system. Pivot handler 206 receives an indication that related content is to be found using queries to sources and repositories. Pivot handler 206 uses queries to find related content, processes query responses, and returns the related content to event handler 204.

Figure 2B:
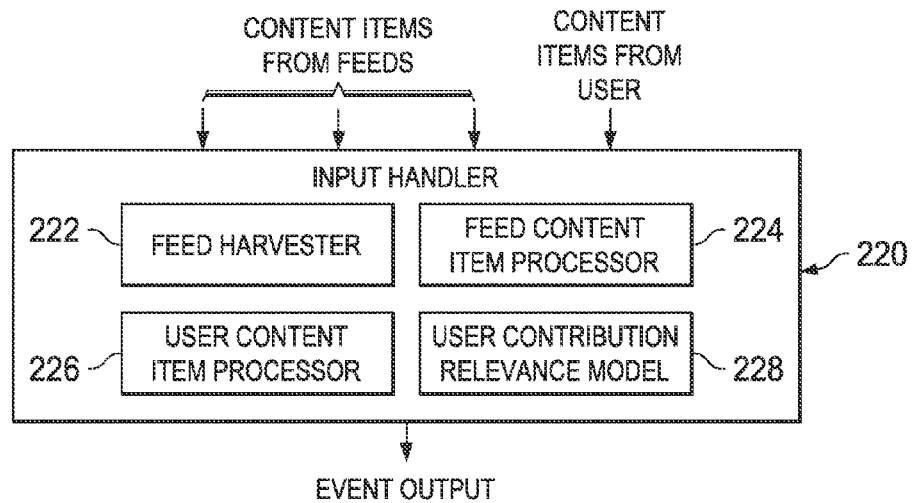
FIG. 2B is a block diagram illustrating an embodiment of an input handler.

FIG. 2B is a block diagram illustrating an embodiment of an input handler. In some embodiment, input handler 220 of FIG. 2B is used to implement input handler 202 of FIG. 2A. In the example shown, input handler 220 includes feed harvester 222, feed content item processor 224, user content item processor 226, user contribution relevance model 228. Feed harvester 222 receives content items from feeds and extracts relevant content to pass to feed content item processor 224. For example, feed harvester 222 comprises an RSS and hypertext markup language (HTML) crawler that examines a predefined set of resources periodically (e.g., news sources every 15 minutes) for new news articles; these new articles are retrieved and the body of the news article is extracted, for example by extracting the longest contiguous piece of text (ignoring format tags) and removing other material—for example, ad units, images, navigation, and other non-context bearing content. Feed content item processor 224 generates a summary for each article, checks for duplicates and near-duplicates by querying an index of previously processed content items, determines a geographic location by determining a weighted list of location candidates, determines named entities, and/or determines a category. User content item processor 226 detects named entities (e.g., famous people, organizations, locations, etc.), determines if the user is the first to report the event, and/or verifies content item before determining if the content item comprises an event. The category is specified by the user when he/she submits an event to the system, so that a category does not need to be determined for the user content item. In some embodiments, the category is determined for the user content item. User contribution relevance model 228 checks relevance of a user contributed content item to an event. In some embodiments, relevance is based at least in part on computing a similarity score based on temporal, location, and/or textual similarity between the content item and a context model of the event.

Figure 2C:
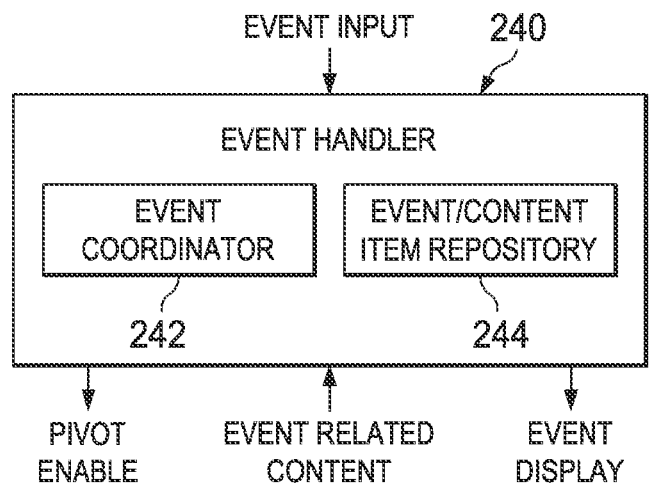
FIG. 2C is a block diagram illustrating an embodiment of an event handler.

FIG. 2C is a block diagram illustrating an embodiment of an event handler. In some embodiments, event handler 240 is used to implement event handler 204 in FIG. 2A. In the example shown, event handler 240 includes event coordinator 242 and event/content item repository 244. Event coordinator 242 analyzes the information contained in, as well as the metadata associated with, a content item; determines if a similar event has been previously processed, associates the content item with a similar event or creates a new event, revises an event location, summary, title, category if appropriate; and/or matches and/or relates feed sourced events with user generated events. In various embodiments, event coordinator 242 is referred to as a content item associator, an event determiner, or any other appropriate name.

Figure 2D:
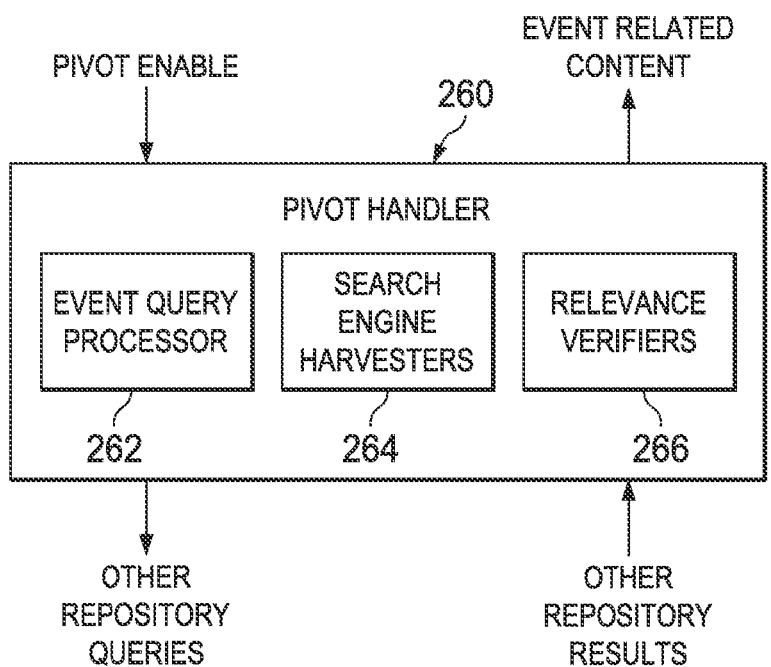
FIG. 2D is a block diagram illustrating an embodiment of a pivot handler.

FIG. 2D is a block diagram illustrating an embodiment of a pivot handler. In some embodiments, pivot handler 260 is used to implement pivot handler 206 of FIG. 2A. In the example shown, pivot handler 260 includes event query processor 262, search engine harvesters 264, and relevance verifiers 266. Event query processor 262 creates a set of queries that are used to aggregate additional information relating to an event. Additional information includes blog entries, images, videos, etc., from online sources, as well as other related events in the system. Search engine harvesters 264 process queries generated by event query processor 262. Search engine harvesters 264 set configurable parameters—for example, how to submit a request to the information repository, how long to wait between requests, how to parse the results returned by the repository, what type of query to accept for processing, and/or the minimum length of a query to accept. In some embodiments, the queries are processed based at least in part on a priority. If a query does not produce any results or any useful results, search engine harvesters 264 will relax the query by removing the least important (e.g., the right-most) term(s) or phrase in the query. In some embodiments, the query is shortened until it reaches a minimum query length. In some embodiments, a query is submitted to geographically relevant sources. For example, a query related to an event associated with a city is submitted to sources associated with the city. Relevance verifiers 266 filter and order the aggregated results from search engine harvesters 264 based on relevance of the image/video/blog to the event it has been retrieved for. Relevance verifiers 266 check to ensure that the information does not originate from a blacklisted site, does not use any blacklisted terms, is not spam, and is related to the topic covered by the event the information was aggregated for.

Figure 3:
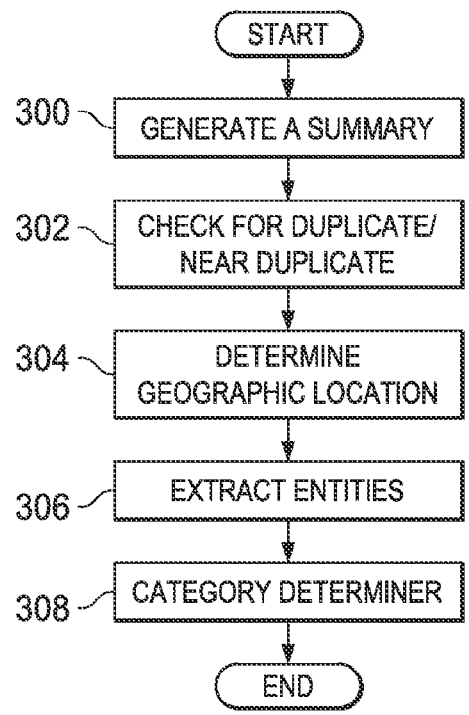
FIG. 3 is a flow diagram illustrating an embodiment of process for a feed content item processor.

FIG. 3 is a flow diagram illustrating an embodiment of process for a feed content item processor. In some embodiments, the process of FIG. 3 is executed by feed content item processor 224 of FIG. 2B. In some embodiments, feed content item processor takes feed content information from a feed harvester and process the information for an event handler. In the example shown, in 300 a summary is generated. A summary is generated for a feed content item (e.g., a news article) by splitting the content into sentences and constructing a two sentence summary that meets length and content heuristics (e.g., 2-5 words preferred with no capital letters and no punctuation). In 302, a check for duplicate/near duplicate is performed. Checking for a duplicate/new duplicate includes generating a query (e.g., a 30 term query) from the feed content item and looking for previously processed articles already indexed by the system (e.g., in the event repository) with a high similarity score. Duplicate/near duplicate checking also validates the check using bigram and unigram (e.g., 2-word units and 1-word units) overlap between the feed content item and the duplicate candidate. In 304, a geographic location is determined. A geographic location is determined using a list of geographic locations associated with the feed content item and a corresponding confidence weight. The geographic location is determined using a set of extraction patterns (e.g., bylines, "to" references, "from" references, "at" references, "in" references, colon preceding, colon succeeding, all capital letters within parentheses, etc.) to build a list of possible locations for the feed content item. Possible locations are derived from a database that currently includes over 200,000 world locations. Each set of extraction patterns has an associated weight that corresponds to the confidence that a location derived from that pattern is the location of the event (e.g., there are different weights assigned to locations associated with bylines, associated with "to" references, associated with "from" references, associated with "at" references, associated with "in" references, associated with colon preceding, associated with colon succeeding, associated with all capital letters within parentheses, etc.). In the event that no location candidates are identified, the feed content item is assigned the location of the feed source of the content item (e.g., organization location, website location, etc.); a confidence weight is assigned to locations determined by this method as well. In some embodiments, the geographic location is determined using a location determiner.

In 306, entities are extracted. Special named entities (e.g., famous people, organizations, places, etc.) are extracted and the frequency with which a special named entity is mentioned in the feed content item is indicated. In various embodiments, entities are extracted using an open source entity extractor (e.g., Balie [Baseline Information Extractor]), by using prepopulated lexicons of entities, or any other appropriate extraction method. In 308, a category is determined. A category is determined using a category associated with or provided by the feed source or using a classifier (e.g., a multitiered classifier, a case-based classifier, a naïve Bayesian classifier, etc.). In various embodiments, a category comprises a topical category—for example, politics, entertainment, sports, science, technology, conflict, tragedy, business, health, elections, local, national, foreign, world, etc.

Figure 4:
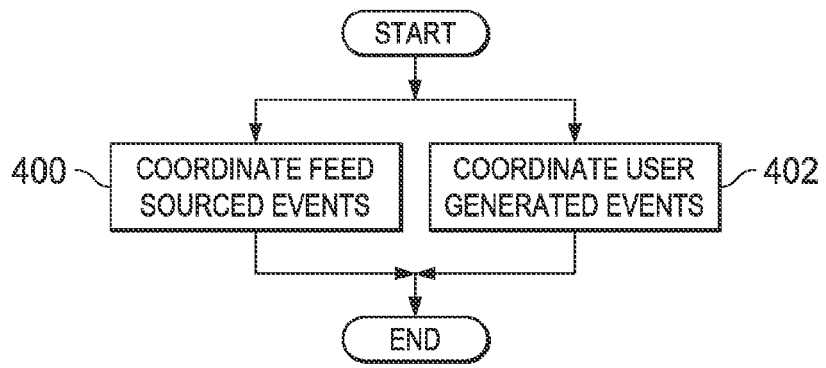
FIG. 4 is a flow diagram illustrating an embodiment of a process for an event coordinator.

FIG. 4 is a flow diagram illustrating an embodiment of a process for an event coordinator. In some embodiments, the process of FIG. 4 is executed by event coordinator 242 of FIG. 2C. In the example shown, in 400 feed sourced events are coordinated. Coordinating feed sourced events includes building a context model for the feed content item using textual information about the content item (e.g., summary, title, body, etc.). The context model associated with the feed content item includes a list of unique unigrams and corresponding TFIDF (term frequency—inverse document frequency) values, a list of bi-grams with corresponding TFIDF values, a list of tokens in order with sentence boundaries indicated, and a list of entities extracted from the title or other elements of the content item. A query is formed using a number of items from the context model (e.g., 30 terms) ordered by TFIDF value. The query is submitted to a repository (e.g., a repository of content items—for example, news stories—that have been already associated with an event) to identify the most similar content items within a time period (e.g., the top 100 most similar news articles, or those above a certain threshold, within the last 24 hours). For the identified most similar events within the time period, calculations are performed to determine a matching event. The location, the category, the title, and the summary are revised, if appropriate, based on the feed content item being aggregated with the matching event. Pivoting, or querying to identify additional relevant information, is enabled if the event qualifies (e.g., at least two resources or one credible resource have participated in the creation of the event). If no matching event is identified, a new event is created from the feed content item. The content item is also matched against user generated events already in the system, and the matching user generated events are related to, aggregated with, or not related to, or not aggregated with the content item as appropriate.

In 402, user generated events are coordinated. Coordinating user generated events includes detecting named entities (e.g., famous people, organizations, places, etc.). Coordinating user generated events also includes determining if the user is the first to report the event by searching previously submitted (e.g., within the last 2 days) user generated events to the system using a query (e.g., a 50 term query formed from terms extracted from the title, summary, blog post, image caption, tags, and/or any other textual information associated with the user submitted content item). If the query does not return a similar user submitted event, then the user submitting the content item receives a graphical "badge" indicating that the user is the first to report the event. A query is formed using the user generated text and tags (e.g., 30 terms where tags are weighted more than text). The query is submitted to the event repository to identify the most similar feed sourced events within a time period (e.g., the top 100 most similar news story events within the last 24 hours). For the identified most similar feed source events within the time period, calculations are performed to determine a matching feed source event. Because the title, location, summary, and category are solicited from the user when they create an event, this information is not revised when other news stories are aggregated to the user's event. In some embodiments, the location, the category, the title, and the summary are revised, if appropriate, based on the user generated content item being aggregated with the matching feed source event. Pivoting, or querying to identify additional relevant information, is enabled if the event qualifies (e.g., any similar news stories are identified or if the user has a reputation score above some tunable threshold). In some embodiments, identifying a similar feed sourced verifies the user generated event. In some embodiments, an event coordinator receives event input and interacts with an event repository.

Figure 5:
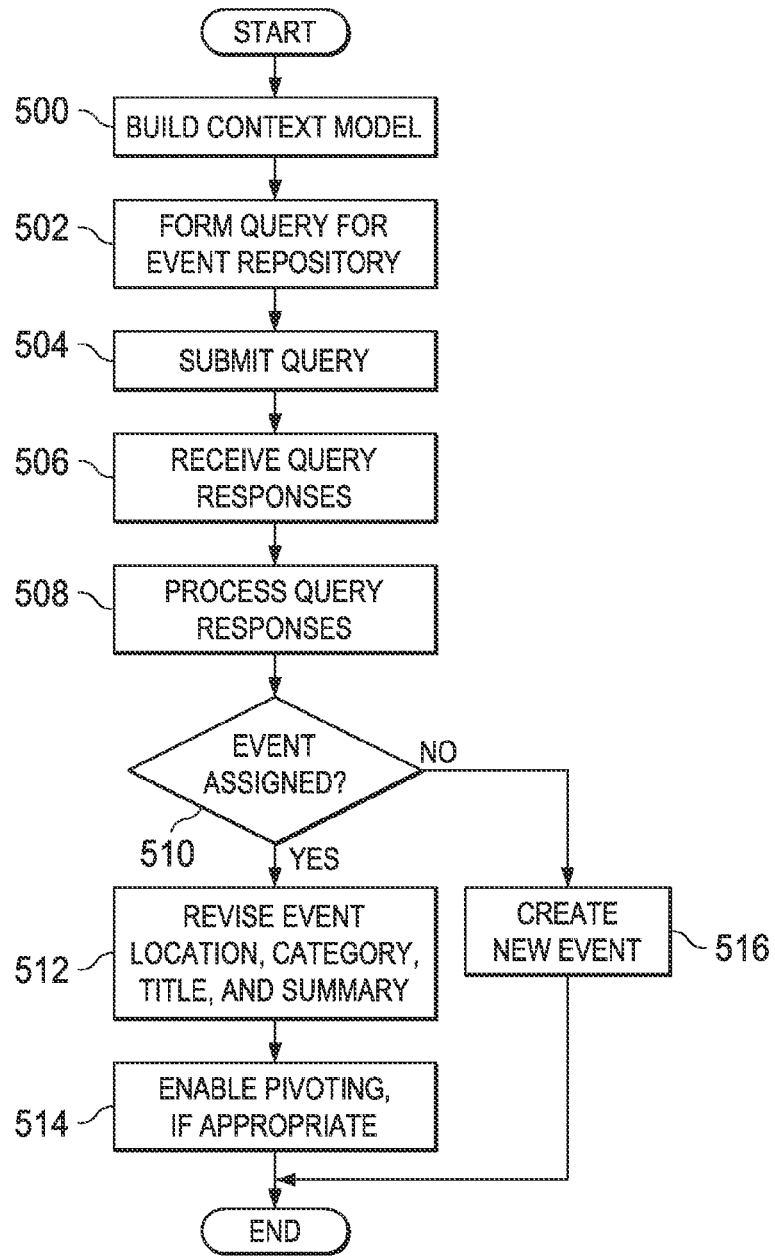
FIG. 5 is a flow diagram illustrating an embodiment of a process for a coordinator for feed sourced events.

FIG. 5 is a flow diagram illustrating an embodiment of a process for a coordinator for feed sourced events. In some embodiments, the process of FIG. 5 is executed by coordinator for feed sourced events 400 of FIG. 4. In the example shown, in 500 a context model is built. The context model for the feed content item is extracted using textual information about the content item (e.g., summary, title, body, etc.). The context model associated with the feed content item includes a list of unique tokens and corresponding TFIDF (term frequency—inverse document frequency) values, a list of bi-grams with corresponding TFIDF values, a list of tokens in order with sentence boundaries indicated, and a list of entities extracted from the title. The TFIDF statistics rely on a corpus of documents. There is a separate corpus of documents, and hence a different statistical model, for each category of events. In 502, a query is formed for the event repository. The query is formed using a number of items from the context model (e.g., 30 terms) ordered by TFIDF value. In 504, the query is submitted. The query is submitted to a repository (e.g., a repository of content items—for example, news stories—that have been already associated with an event) to identify the most similar content items within a time period (e.g., the top 100 most similar news articles within the last 24 hours). In various embodiments, a time based function is used to help determine appropriate similar content items and/or to determine appropriate content items/events to match to the feed sourced content item. In 506, the query responses are received. In 508, the query responses are processed. In 510, it is determined if the event is assigned. The matching event with the highest average overall score as determined by the processing in 508 is assigned as the event to the feed sourced content item. If the event is assigned, in 512 the location, the category, the title, and the summary of the event are revised, if appropriate, based on the feed content item being aggregated with the matching event. In various embodiments, the location, the category, the title, and the summary are revised using a reviser, for example, a location reviser, a category reviser, a title reviser, a summary reviser, or any other appropriate processor. In 514, pivoting is enabled, if appropriate. In some embodiments, pivoting is enabled when at least two resources or one credible resource have participated in the creation of the event. If the event is not assigned, in 516 a new event is created from the feed content item.

Figure 6:
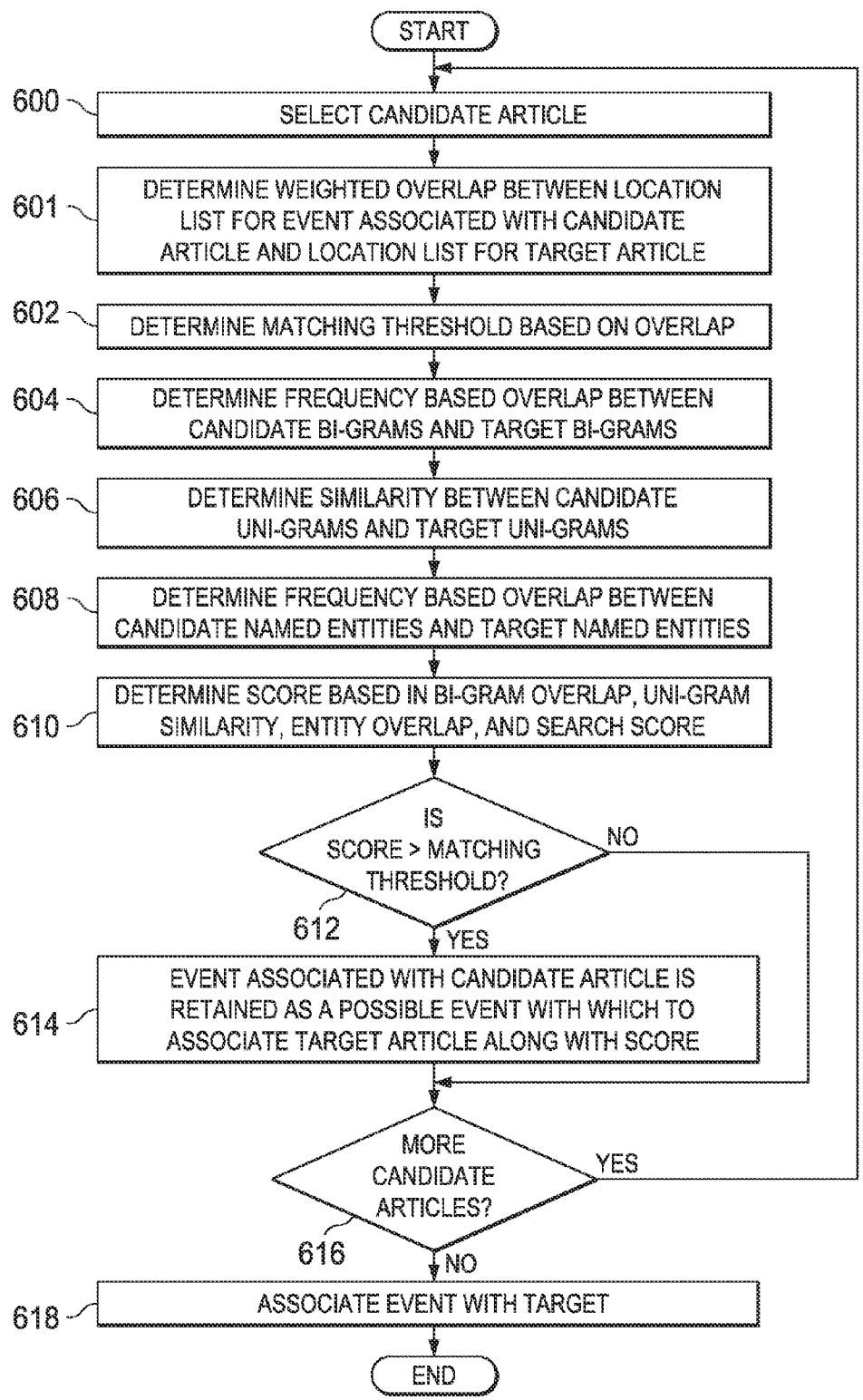
FIG. 6 is a flow diagram illustrating an embodiment of a process for processing query responses within the event coordinator.

FIG. 6 is a flow diagram illustrating an embodiment of a process for processing query responses within the event coordinator. In some embodiments, the process of FIG. 6 is used to implement 508 of FIG. 5. In the example shown, in 600 a candidate article is selected. A candidate article is selected from the one or more query responses. In 601, a weighted overlap is determined between a location list for the event associated with the candidate article and the location list of the target article. The candidate article comprises a previously processed content item that has already been associated with a previously identified event, as returned as a query response. The target article comprises the feed sourced content item. In 602, a matching threshold is determined based on location overlap. The less sure the system is that the stories occurred in the same location (i.e., the lower the location overlap score), the higher the threshold that is required for content similarity to infer that the candidate article and the target article may refer to the same underlying event. In some embodiments, the threshold is set at an appropriate predefined value if: 1) either the candidate or the target has a resource location; 2) the candidate and the target share the top location and the location is a city; 3) the candidate and the target share the top location and the location is a country; 4) the candidate location list has some overlap with the target location list; 5) the candidate location list has no overlap with the target location list; and 6) the candidate and the target have high similarity according to the event repository search algorithm. For example, the threshold may be set for 1) to 0.28, for 2) to 0.15, for 3) to 0.22, for 4) to 0.25, for 5) 0.32, and for 6) to 0.13, where a higher value corresponds to higher degree of similarity that is required to determine that the candidate and target articles match.

In 604, a frequency based overlap is determined based on candidate bi-grams and target bi-grams. In 606, the similarity is determined between candidate unigrams and target unigrams. In some embodiments, similarity comprises a cosine similarity measure. In 608, a frequency based overlap is determined between candidate named entities and target named entities. In 610, a score is determined based on bi-gram overlap, unigram similarity, entity overlap, and initial search score.

In 612, it is determined if the score is greater than the matching threshold. In the event that the score is greater than the matching threshold, then in 614 the event that is associated with the candidate article is retained as a possible event with which to associate the target article, along with the corresponding score. In some embodiments, the received content item (e.g., target article) is determined to be associated with an event (e.g., the event associated with the candidate article) based at least in part on an indicia of relatedness (e.g., a score for example, a bi-gram overlap, a unigram similarity, or an entity overlap other than location), where the criteria that the indicia of relatedness is required to satisfy (e.g., the criteria is that the score is required to be greater than a matching threshold) has a lower value if the location associated with the received content item (e.g., the location associated with the target article) has a first degree of correspondence (e.g., a threshold of 0.15 if the locations are similar for example, the same city) than if the location associate with the received content item has a second, lower degree of correspondence to the location associated with the event (e.g., a threshold of 0.32 if the locations are not similar at all for example, no overlap between locations on list associated with the target and candidate content items). In various embodiments, the number of candidates is finite, the number of candidates is determined by the number of candidates whose score is above a predetermined threshold, or any other appropriate manner of selecting the number of candidates.

In 616, it is determined if there are more candidate articles. In the event that there are more candidate articles, control passes to 600. In the event that there are no more candidate articles, in 618 it is determined which event is to be associated with the target. The average score of each associated event retained during this process, and the number of candidates contributing to that average (e.g., associated with the retained event), are combined to determine an overall score for each retained event. The event with the highest resulting score is then associated with the target content item (e.g., article). For example, the top 100 candidates whose score exceeds a tunable threshold are used to determine an associated event by looking at the events associated with these candidates and computing a score (e.g., an average or weighted score of the candidates) associated with each event. The score and the number of candidates contributing to that score are then used to determine the appropriate associated event. In some embodiments, the event associated with the received content item is one of a plurality of candidate events determined at least in part using one or more prior received content items (e.g., articles). In some embodiments, the plurality of candidate events are each assigned a rating based on weightings of indicia of similarity between the content item and prior received content items associated with each candidate event as well as the number of those prior received content items associated with the given candidate event.

Figure 7:
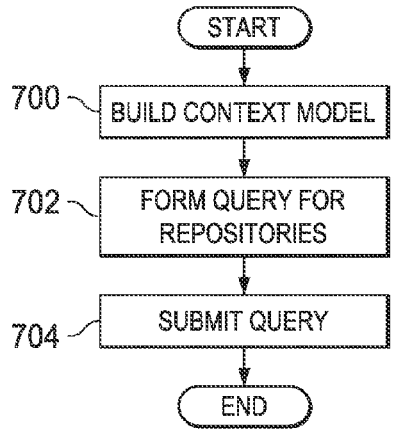
FIG. 7 is a flow diagram illustrating an embodiment of a process for event query processing.

FIG. 7 is a flow diagram illustrating an embodiment of a process for event query processing. In some embodiments, the process of FIG. 7 is executed by event query processor 262 of FIG. 2D. In some embodiments, event query processing is used for pivoting or identifying and acquiring information to supplement event information. In the example shown, in 700 one or more context models is/are built. For feed sourced content items, three context models are built: c1) just titles of the news articles; c2) titles and summaries of the news articles; and c3) titles/summary/body of the news articles. For user generated content items, a context model (c4) is built using tags and title and summary and user contributed textual information. In 702, a query is formed for the repositories. For feed sourced content items, a query is generated as follows: bi-grams with frequency greater than 2 are retrieved from c1; terms in c1 that do not appear in c3 are discarded; a five term query is generated from c1 (or c2 if not enough terms are present in c1); if the location of the event is found in c1, the location is appended to the front of the query; the terms of the query are ordered based on the bi-grams of c1. For user generated content items, a query is generated as follows: bi-grams are retrieved from c4; if the location of the event is found in c4, the location is appended to the front of the query; the terms of the query are ordered based on the bi-grams of c4. In 704, a query is submitted. For each enabled search engine, a query job is created using the query generated above and passed to the search engine harvesters (e.g., search engine harvester 264 of FIG. 2D). For a user generated event, the query is given a high priority which will result in near immediate processing. Queries are sent to search image repositories, video repositories, blog repositories or sites, related event repositories, face image repositories, and/or any other appropriate repositories for identifying related information.

Figure 8:
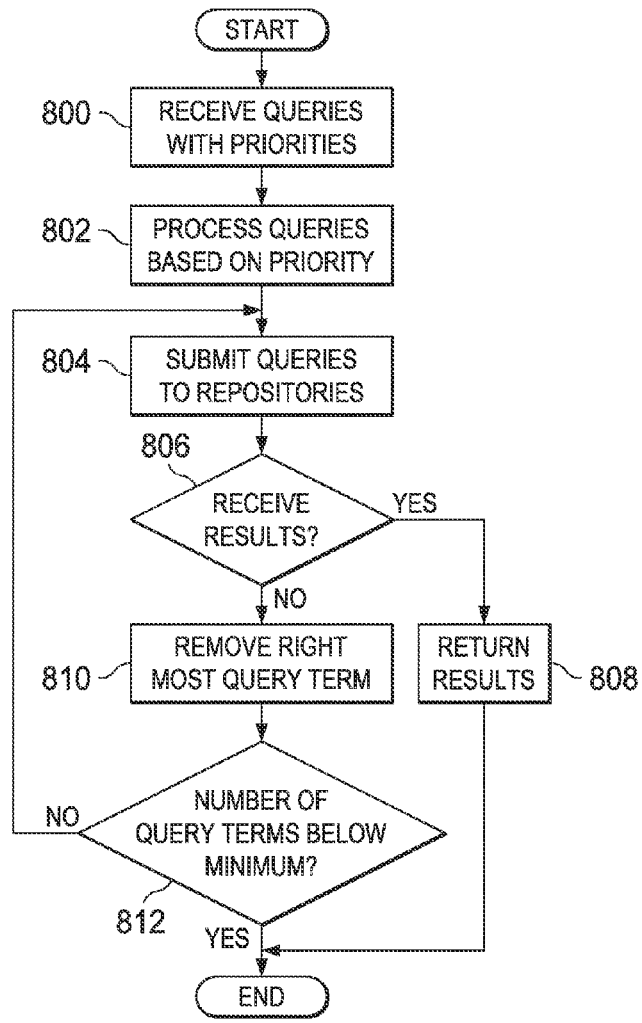
FIG. 8 is a flow diagram illustrating an embodiment of a process for a search engine harvester.

FIG. 8 is a flow diagram illustrating an embodiment of a process for a search engine harvester. In some embodiments, the process of FIG. 8 is executed by search engine harvester 264 of FIG. 2D. In the example shown, in 800 queries are received with priorities. In 802, queries are processed based on priorities. In 804, queries are submitted to repositories. In 806, results are received. In the event that results are received, in 808 the search results are returned, and the process ends. The search results are returned to relevance verifiers (e.g., relevance verifiers 266 of FIG. 2D). In the event that results are not received, in 810 the least important (e.g., right most) query term is removed. In 812, it is determined if the number of query terms is below the minimum number of query terms. In the event that the number of query terms is not below the minimum number of query terms, then control passes to 804. In the event that the number of query terms is below the minimum number of query terms, the process ends.

Figure 9:
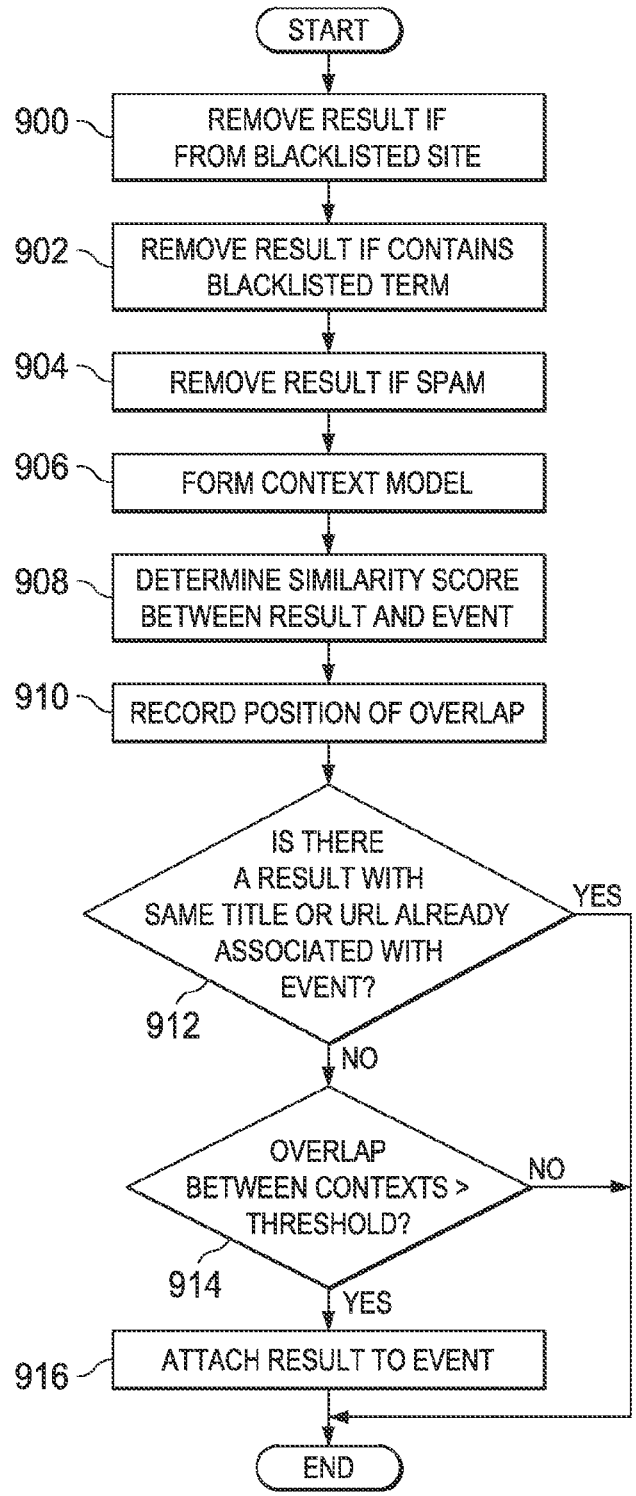
FIG. 9 is a flow diagram illustrating an embodiment of a process for a relevance verifier.

FIG. 9 is a flow diagram illustrating an embodiment of a process for a relevance verifier. In some embodiments, the process of FIG. 8 is executed by relevance verifier 266 of FIG. 2D. In the example shown, in 900 the result is removed if from a blacklisted site. In 902, the result is removed if it contains a blacklisted term. In 904, the result is removed if the result is spam. In 906, a context model is formed for the result. The context model is formed using all textual information from the result (e.g., title, summary, tags, body of the query result, etc.). In 908, a similarity score is determined between a result and an event. The similarity score comprises a weighted TFIDF-based similarity score between the result and the event context models. In some embodiments, the event context model comprises the concatenated text of all the articles associated with the event. In 910, the position overlap is recorded. The overlap is based on TFIDF. In 912, it is determined if there is a result that has the same title or URL already associated with the event. If there is a result already associated with the event, then the process ends. If there is not a result that has the same title or URL already associated with the event, then in 914 it is determined if the overlap between contexts is greater than a threshold. If the overlap is greater than the threshold, then in 916 the result is attached to the event. If the overlap is not greater than the threshold, then the process ends. In some embodiments, in addition to requiring that the overlap between the contexts be greater than a threshold, there is also a requirement that there be a sufficient number of highly important words that occur in the overlap.

Figure 10:
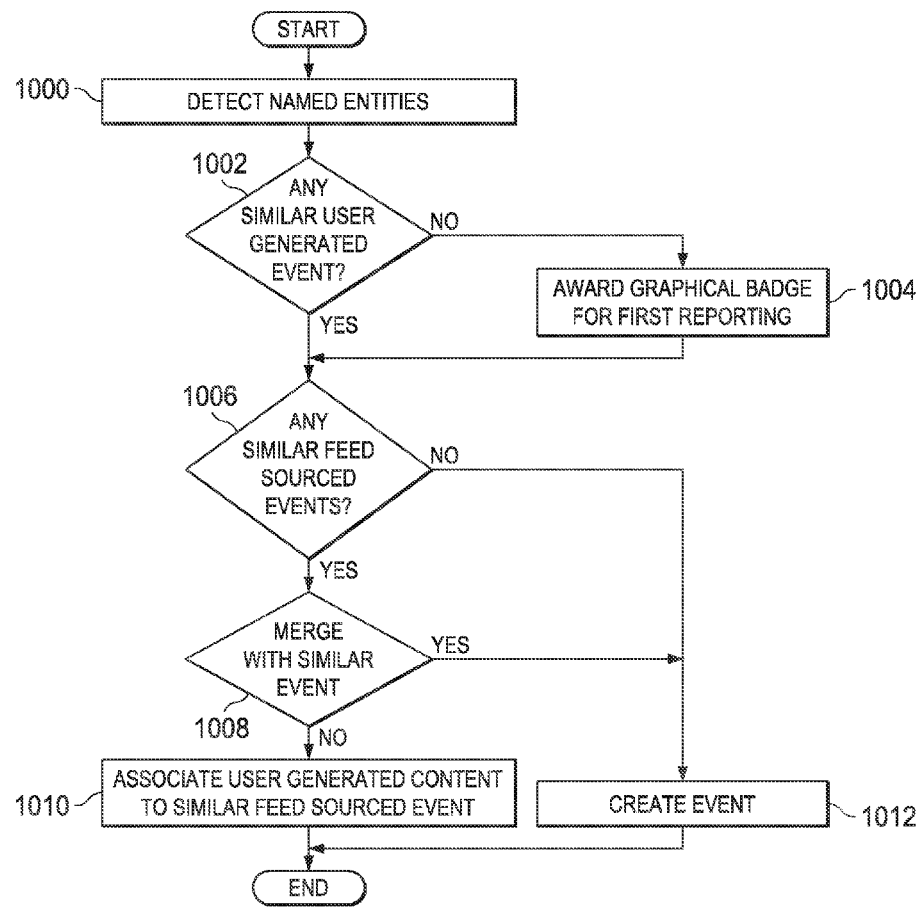
FIG. 10 is a flow diagram illustrating an embodiment of a process for user content item processor.

FIG. 10 is a flow diagram illustrating an embodiment of a process for user content item processor. In some embodiments, the process of FIG. 10 is used to implement 226 of FIG. 2B. In the example shown, in 1000 named entities are detected. Named entities comprise people (sometimes famous), organizations, places, etc. In 1002, it is determined if there are any similar user generated events. A query is formed from the title and summary (e.g., a 50 term query) and used to identify a user generated event within a time period (e.g., within the last two days). If all returned user generated events are not similar to the user content item, then in 1004 a graphical "badge" is awarded indicating that the user is the first to report the event and control is passed to 1006. If there are similar user generated events, then in 1006, it is determined if there are any feed sourced events that are similar. In some embodiments, similar events are searched for using a query within a two day window. In some embodiments, a query is generated as follows: bi-grams are retrieved from a context model of the event (e.g., tags and title and summary and user contributed textual information); if the location of the event is found in the context, the location is appended to the front of the query; the terms of the query are ordered based on the bi-grams of the context. In some embodiments, a content item aggregator aggregates a content item with the event by using submitting a query to one or more repositories. In various embodiments, the one or more repositories comprise a video repository, an image repository, a face image repository, a blog repository, or any other appropriate repository. If there are no similar feed sourced events, then in 1012 the event is created. If there are any similar feed sourced events, it is determined in 1008 if the user generated event is to contribute to the similar feed sourced event. If the user generated event is to contribute to an existing event, in 1010 the content is associated with the existing event as a blog post, comment, image, or video. If the feed sourced event is not to contribute, then the event is created in 1012.

Figure 11:
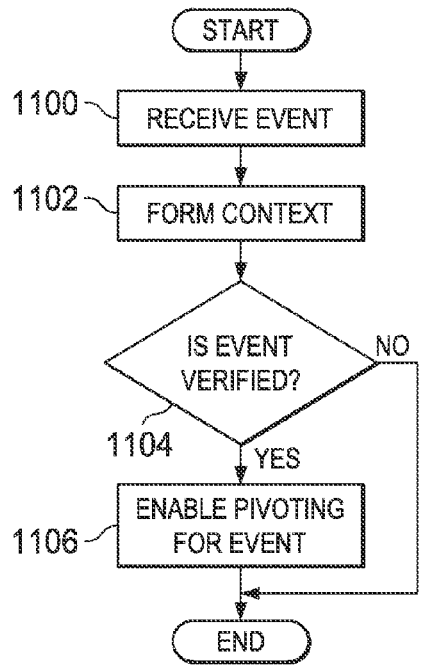
FIG. 11 is a flow diagram illustrating an embodiment of a process for user generated events.

FIG. 11 is a flow diagram illustrating an embodiment of a process for user generated events. In some embodiments, the process of FIG. 11 is executed by event coordinator 242 of FIG. 2C. In the example shown, in 1100 an event is received. In 1102 a context model is formed. In 1104, it is determined if the event is verified. In some embodiments, if a returned user generated content item from a query is similar to the user content item, then the event is verified. In some embodiments, verification includes identifying a similar feed sourced content item similar to the user content item. In some embodiments, text and tags are used to generate a query for the event repository to determine if a similar feed sourced event has been received by the system within a time period (e.g., the last 24 hours). In various embodiments, verification comprises identifying a predetermined number of user submitted content items corresponding to the same event, identifying that the provider of the if the user-provided content item satisfies a trusted user criteria (e.g., has a history of submitting one or more previously verified events, has no history of submitting a false event, etc.), or any other appropriate verification. If the event is verified, in 1106 pivoting is enabled for the event and the process ends. Pivoting searches repositories for content items (e.g., blog entries, images, videos, etc.) related to the event. Content items related to the event are checked for relevance. In some embodiments, relevance is assessed based on a model of the event.

Figure 12:
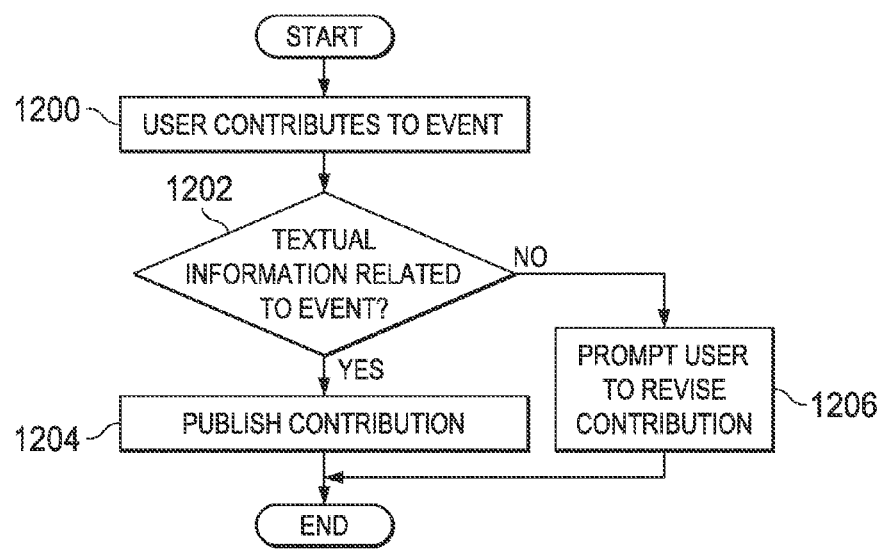
FIG. 12 is a flow diagram illustrating an embodiment of a process for a user contributing to an event.

FIG. 12 is a flow diagram illustrating an embodiment of a process for a user contributing to an event. In some embodiments, the process of FIG. 12 is executed by user contribution relevance model 228 in FIG. 2B. In the example shown, in 1200 a user contributes to an event. For example, images, videos, or blogs to existing events (both system and user-generated). In 1202 a check is made to make sure that the textual information attached to the contribution is related to the event. For example, in the case of a system generated event, it compares the contribution to a context (e.g., a context comprising a title and a summary) and determines a TFIDF overlap. In the case of a user-generated event, textual information provided by the event creator is checked for overlap to the contribution context. If the overlap is above a threshold, the contribution passes the relatedness check. In the event that the contribution is related, then in 1204 the contribution is published. In the event that the contribution is not related, then in 1206 the user is prompted to revise the submission. In some embodiments, relevance is based at least in part on computing a similarity score based on temporal, location, and/or textual similarity between the content item and a context model of the event.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for associating a content item with an event, comprising:

determining, by a computer having a processor and non-transitory computer memory including instructions executable by the processor, a location associated with a received content item from a source communicatively connected to the computer;

selecting a plurality of previously processed content items, each associated with a previously identified event;

for each of the selected plurality of previously processed content items:

determining a location overlap between the location associated with the received content item and a location associated with the previously processed content item;

determining a matching threshold based on the location overlap;

determining a score representing a degree of non-location based similarity between the received content item and the previously processed content item; and retaining the event associated with the previously processed content item when the score is greater than the matching threshold;

determining an overall score for each retained event of one or more retained events based at least on an average of the determined scores of the previously processed content items associated with the respective retained event;

selecting an event from the one or more retained events based on the overall scores of the one or more retained events; and associating, by the computer, the received content item with the selected event.

2. The method as in claim 1, wherein the degree of non-location based similarity between the received content item and the previously processed content item relates to a frequency-based overlap.

3. The method as in claim 2, wherein the frequency-based overlap is determined based on candidate bi-grams and target bi-grams.

4. The method as in claim 1, wherein the degree of non-location based similarity between the received content item and the previously processed content item relates to a unigram similarity.

5. The method as in claim 4, wherein the unigram similarity comprises a similarity between unigrams associated with the received content item and unigrams associated with a content item associated with the event.

6. The method as in claim 1, wherein the degree of non-location based similarity between the received content item and the previously processed content item relates to an entity overlap.

7. The method as in claim 6, wherein the entity overlap comprises a frequency based overlap between named entities associated with the received content item and named entities associated with the previously processed content item.

8. A system for associating a content item with an event, comprising:

a location determiner running on one or more computers each having a processor and non-transitory computer memory including instructions executable by the processor for determining a location associated with a received content item; and a content item associater running on the one or more computers, the non-transitory computer memory including further instructions executable by the processor for associating the received content item with an event, wherein the further instructions comprise:

selecting a plurality of previously processed content items, each associated with a previously identified event;

for each of the selected plurality of previously processed content items:

determining a location overlap between the location associated with the received content item and a location associated with the previously processed content item;

determining a matching threshold based on the location overlap;

determining a score representing a degree of non-location based similarity between the received content item and the previously processed content item; and retaining the event associated with the previously processed content item when the score is greater than the matching threshold;

determining an overall score for each retained event of one or more retained events based at least on an average of the determined scores of the previously processed content items associated with the respective retained event;

selecting an event from the one or more retained events based on the overall scores of the one or more retained events; and associating, by the one or more computers, the received content item with the selected event.

9. The system of claim 8, wherein the degree of non-location based similarity between the received content item and the previously processed content item relates to a frequency-based overlap.

10. The system of claim 9, wherein the frequency-based overlap is determined based on candidate bi-grams and target bi-grams.

11. The system of claim 8, wherein the degree of non-location based similarity between the received content item and the previously processed content item relates to a unigram similarity.

12. The system of claim 11, wherein the unigram similarity comprises a similarity between unigrams associated with the received content item and unigrams associated with a content item associated with the event.

13. The system of claim 8, wherein the degree of non-location based similarity between the received content item and the previously processed content item relates to an entity overlap.

14. The system of claim 13, wherein the entity overlap comprises a frequency based overlap between named entities associated with the received content item and named entities associated with the previously processed content item.

15. A computer program product for associating a content item with an event, the computer program product embodied in a non-transitory computer readable storage medium comprising computer instructions executable by one or more computers for:

determining a location associated with a received content item;

selecting a plurality of previously processed content items, each associated with a previously identified event;

for each of the selected plurality of previously processed content items:

determining a location overlap between the determined location associated with the received content item and a location associated with the previously processed content item;

determining a matching threshold based on the location overlap;

determining a score representing a degree of non-location based similarity between the received content item and the previously processed content item; and retaining the event associated with the previously processed content item when the score is greater than the matching threshold;

determining an overall score for each retained event of one or more retained events based at least on an average of the determined scores of the previously processed content items associated with the respective retained event;

associating the received content item with an event, by selecting an event from the one or more retained events based on the overall scores of the one or more retained events.

16. The computer program product of claim 15, wherein the degree of non-location based similarity between the received content item and the previously processed content item relates to a frequency-based overlap.

17. The computer program product of claim 16, wherein the frequency-based overlap is determined based on candidate bi-grams and target bi-grams.

18. The computer program product of claim 15, wherein the degree of non-location based similarity between the received content item and the previously processed content item relates to a unigram similarity.

19. The computer program product of claim 18, wherein the unigram similarity comprises a similarity between unigrams associated with the received content item and unigrams associated with a content item associated with the event.

20. The computer program product of claim 15, wherein the degree of non-location based similarity between the received content item and the previously processed content item relates to an entity overlap.

21. The computer program product of claim 20, wherein the entity overlap comprises a frequency based overlap between named entities associated with the received content item and named entities associated with the previously processed content item.

* * * * *